United States Patent [19]

Borel

[11] Patent Number: 4,968,378

[45] Date of Patent: Nov. 6, 1990

[54] APPARATUS FOR APPLYING A PERFORATED BAND OR TAPE TO AN EDGE OF A SHEET

[75] Inventor: Pierre Borel, St. Martin D'Heres, France

[73] Assignee: Societe Anonyme Jowa, Sassenage, France

[21] Appl. No.: 312,015

[22] Filed: Feb. 16, 1989

[51] Int. Cl.[5] .............. B32B 31/18

[52] U.S. Cl. .............. 156/516; 156/517; 156/522; 156/552

[58] Field of Search .............. 156/513, 514, 516, 517, 156/522, 552

[56] References Cited

U.S. PATENT DOCUMENTS

| | | | |
|---|---|---|---|
| 2,627,406 | 2/1953 | Mestre | 156/517 |
| 3,181,988 | 5/1965 | Engert | 156/517 |
| 4,028,170 | 6/1977 | Savarimuthu | 156/513 |
| 4,288,280 | 9/1981 | Morin | 156/517 |

*Primary Examiner*—Caleb Weston

*Attorney, Agent, or Firm*—Herbert Dubno

[57] ABSTRACT

An apparatus for applying self-adhesive perforated tape to the edge of a sheet has a plate formed with a groove into which a self-adhesive perforated tape is fed from a receptacle at one end of the groove. Stops are provided for aligning the paper which can be pressed against the self-adhesive half of the perforated tape and a cutter can sever the tape along the lateral edge of the sheet so that the length of applied tape is equal to the length of the paper edge.

9 Claims, 2 Drawing Sheets

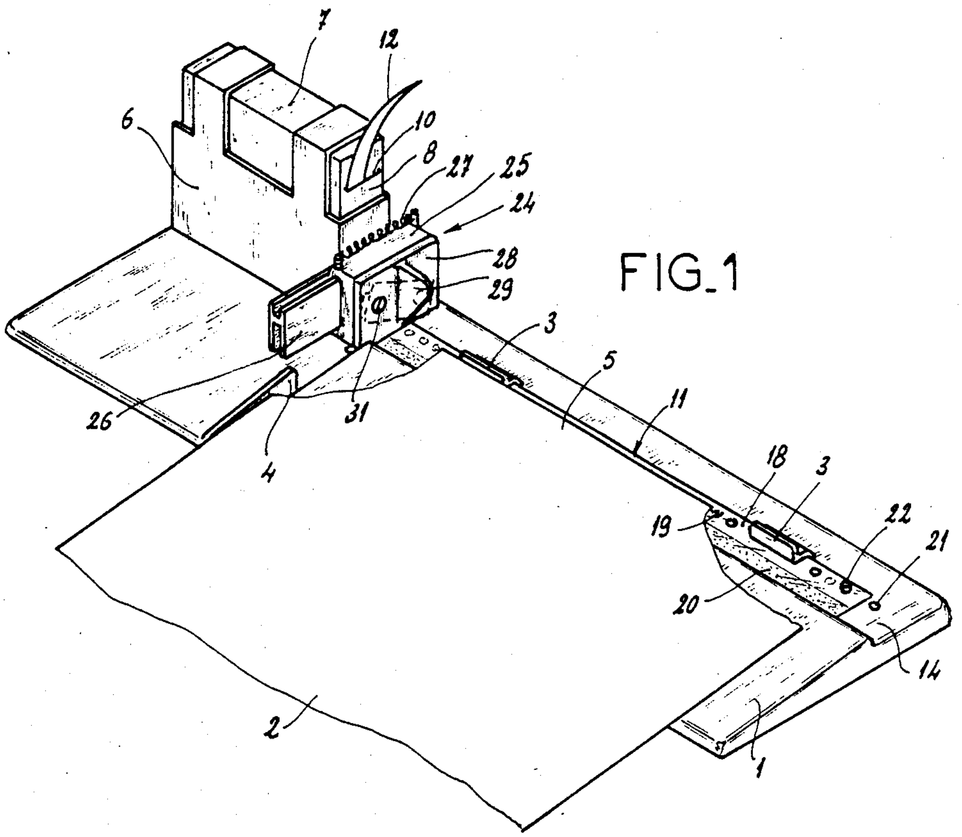
FIG_1
FIG_4
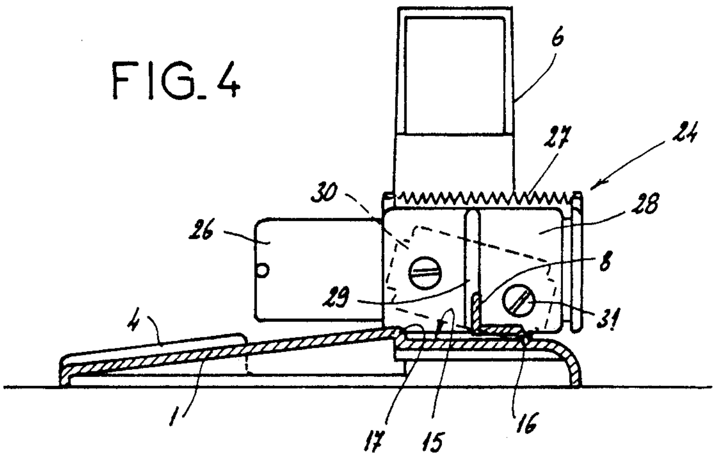

APPARATUS FOR APPLYING A PERFORATED BAND OR TAPE TO AN EDGE OF A SHEET

FIELD OF THE INVENTION

My present invention relates to an apparatus for applying a reinforcing, classifying, mounting or other perforated band or tape, combined with a contact-type or pressure-sensitive adhesive, hereinafter also referred to as a self-adhesive perforated strip, to the edge of a sheet, usually a paper sheet.

BACKGROUND OF THE INVENTION

For certain kinds of classification systems, for the mounting of paper sheets in collections or for reinforcement purposes, it has been common heretofore to apply to sheets, along at least one of the edges thereof, a set of perforation which can, for example, be adapted to the type of classification system which is used. A typical classification system cf this type, of course, utilizes rods or needles which can be threaded through intact perforations to support the sheets while perforations which have been opened allow other sheets to drop from a sheet.

A particularly convenient method of applying these perforations to a sheet and in general for applying perforations to a sheet, involves the application of a perforated, semirigid band, strip or tape of a synthetic resin or plastic along a nonperforated edge of the sheet.

This band thus also constitutes a reinforcing band for the edge of the sheet. The reinforcing band is formed longitudinally over a first half of the width of the tape with the perforations and over a second half of the tape is covered by a longitudinal layer of a contact o r pressure adhesive so that the tape is a self-adhesive tape.

Customarily, the self-adhesive layer is itself covered for storage and handling by a thin protective band or strip, also of a synthetic resin or plastic material, which is more flexible than the perforated tape and which can be drawn off from the perforated tape before use of the latter. This strippable band can be referred to conveniently as a masking band or strip because it prevents premature contact of the adhesive layer with a substrate, with the fingers or with any applicator which may be used.

The reinforcing or classifying strips thus described have generally been provided heretofore as rectangular strips precut to standard lengths corresponding to the lengths of the frontal edges of the sheets to which they are to be applied. They also may be provided in continuous rolls respectively received in a receptacle or dispenser from which the tape can be fed.

Utilization of such classifier strips requires cutting the strip to length, removing the masking strip covering the self-adhesive half of the tape, placing the classifying tape along the edge of the sheet so that the self-adhesive half covers the sheet, and application of high pressure against the tape to bond the latter to the underlying sheet.

These operations require utmost care and attention since the danger of misalignment or slipping is great. Indeed such classifying tapes cannot be applied without a high degree of waste except by highly skilled and proficient individuals.

OBJECT OF THE INVENTION

It is, therefore, the principal object of the present invention to provide an improved apparatus which will expedite the application of such classifying or reinforcement tapes to paper sheets without the drawbacks enumerated above.

Another object of the invention is to provide an improved apparatus for applying a self-adhesive perforated tape to a paper sheet, whereby the risk of misalignment is reduced and the number of faulty applications is diminished or faulty application is precluded entirely.

SUMMARY OF THE INVENTION

These objects and others which will become apparent hereinafter are attained, in accordance with the invention, in an apparatus for applying a self-adhesive perforated strip to a frontal edge of a sheet which comprises:

a plate having a surface on which the sheet can be placed flat;

frontal stops on the plate engageable with the edge of the sheet and at least one lateral stop on the plate engageable with a lateral edge of the sheet for aligning the sheet on the plate;

means on the plate outside a region thereof overlain by the sheet for receiving and positioning a receptacle containing a roll of a perforated tape, the perforated tape being formed with a pressure adhesive along one longitudinal portion of the tape, a row of perforations along another longitudinal portion of the tape and a masking strip covering the adhesive and strippable from the tape, the means on the plate being positioned so that the tape can be withdrawn from the receptacle along the plate without the strip and with the adhesive turned upwardly;

a groove formed in the surface of the plate, receiving the tape withdrawn from the receptacle, at least partially overhung by the frontal stops and overlain by the frontal edge of the sheet when the frontal edge of the sheet engages the frontal stops, whereby the sheet can be pressed against the adhesive along the frontal edge;

means in the groove remote from the receptacle for anchoring a free end of the tape; and means at an end of the groove proximal to the receptacle for cutting from the roll a length of the tape equal to the length of the frontal edge.

Advantageously, the means on the plate outside the region thereof overlaying by the sheet and receiving the receptacle is disposed on a surface of the plate above the floor of the groove and the groove commences substantially at the location at which the cutting means is effective. Advantageously, the cutting means includes a blade carrier movable perpendicularly to the frontal edge, and provided with a blade which is aligned which the surface of the lateral stop to cut the tape true with the lateral edge of the sheet.

The means for anchoring the free end of the tape may be adjustable to suit a variety of lengths of the frontal edge thereof and can be, for example, a pin which is selectively receivable in respective holes formed in the floor of the groove and onto which the first perforation of the tape at the free end thereof (or the last perforation) can be placed.

According to a further feature of the invention, the receptacle receiving means or casing is provided with an opening to the rear thereof enabling insertion of the receptacle containing the roll of tape.

The receptacle, in addition, can be provided with two slots on a lateral face or side of the receptacle turned toward the groove and enabling the tape to be withdrawn from the receptacle separately from the masking strip.

A first slot, therefore, can be located at the bottom of the lateral face and through which the tape can pass after the masking strip has been peeled therefrom. The second slot can be located at an upper portion of the face and can enable the peeled masking strip to be fed from the receptacle.

The cutting means can comprise a body manually displaceable on a guide and provided with the cutting blade.

BRIEF DESCRIPTION OF THE DRAWING

The above and other objects, features and advantages of my invention will become more readily apparent from the following description, reference being made to the accompanying highly diagrammatic drawing in which:

FIG. 1 is a perspective view, partly broken away, of the apparatus according to the invention showing the application of a perforated tape to the sheet;

FIG. 4 is a sectional view taken along the line IV—IV of FIG. 3.

SPECIFIC DESCRIPTION

Figure 3:
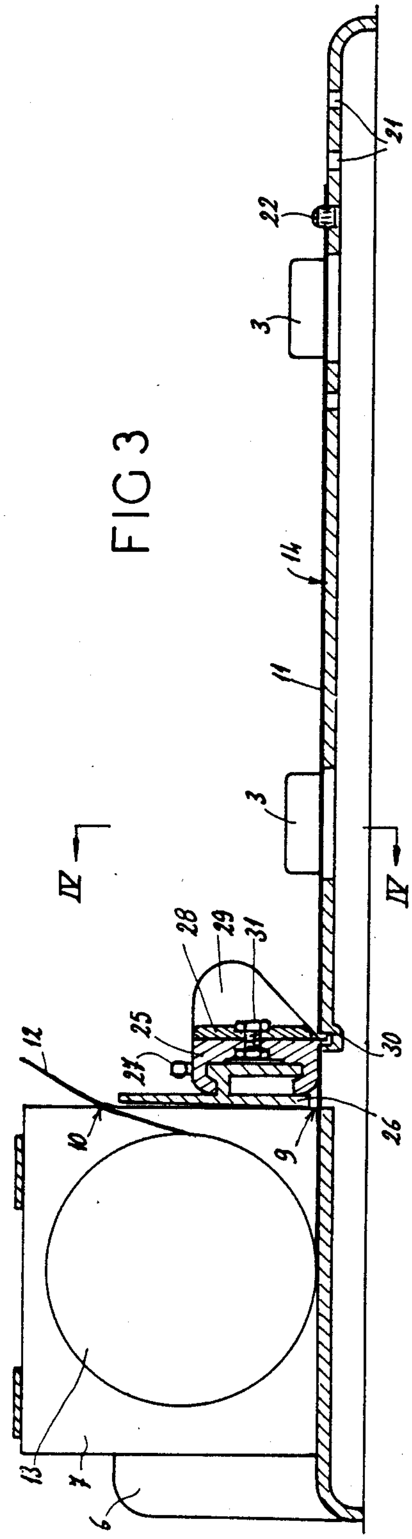
FIG. 3 is a sectional view taken along the line III—III of FIG. 2.

From the drawing it will be apparent that the apparatus comprises a plate 1 adapted to receive a sheet of paper 2 which can be placed flat on the plate and to which a perforated reinforcing strip can be applied. This paper sheet 2 is positioned on the plate against 2 frontal stops 3 engaging a frontal edge 5 of the sheet, and a lateral stop 4 engaging a lateral edge along which the tape is to be cut as will be described below.

In longitudinal alignment with frontal edge 5 which is to be reinforced by the perforated tape, is fixed at the extreme left of the plate 1 and outside the region covered by the sheet, a casing 6 which is open toward the rear and into which can be inserted a dispensing receptacle or container 7 for a continuous reinforcing tape in a roll 13

The distributor container 7 is provided with two outlet slots on its right-hand lateral face 8, namely, a first slot 9 located at the base of this face 8 and from which the perforated tape 11 emerges as this tape is drawn off the roll and thin plastic masking tape 12 is peeled therefrom. The second slot 10, located above the slot 9 serves to allow the flexible masking strip 12 to be fed from the dispensing container 7. When this masking strip is pulled, therefore, the tape 11 is advanced.

If the tape 11 is drawn off the roll and drawn across the plate 1, the masking strip 12 is peeled from the tape and passes out of the container 7 through the slot 10.

The self-adhesive tape 11 is semirigid so that which lies flat on the floor 14 of a track for this tape formed by a groove 15 recessed below the upper surface of the plate.

One of the sides of this groove 15 is discontinuous and is constituted by the rear parts 16 of the 2 frontal stops 3. The other side of the groove 17 is continuous.

The half 18 of the tape 11 which is formed with the perforations 19 thus engages the stop surface of the frontal stops 3 which have the profile illustrated best in FIG. 4, so that the half 20 provided with the self-adhesive layer lies inwardly of the edge 5 sheet 2 so that the portion of the sheet 2 adjoining the edge 5 partially covers the path 15 (FIGS. 2 and 4) and entirely covers the adhesive layer.

At the downstream end of the groove 15, i.e. in the region at which the free end 32 of the tape 11 is disposed, there are provided a number of holes 21 positioned to receive replaceably a pin 22 of substantially the same diameter as the hole and dimensioned to accommodate the perforations.

The last perforation 23 at the free end of the tape 11 or the first perforation thereof can be anchored on the pin 22 to maintain the tape 11 in position. Of course, the three holes 21 are located to accommodate different standard sizes of the lengths of the edge 5 and hence the various formats of the sheet, for example, format standard A4, format listing 297, format listing 305, etc.

The apparatus also comprises, between the casing 6 and the proximal end of the groove 15, a device 24 for cutting the tape 11. This device 24 is positioned to separate the tape 11 from the remainder of the roll and to in part to the severed piece of tape a length equal to that of the edge 5 of the sheet.

Figure 2:
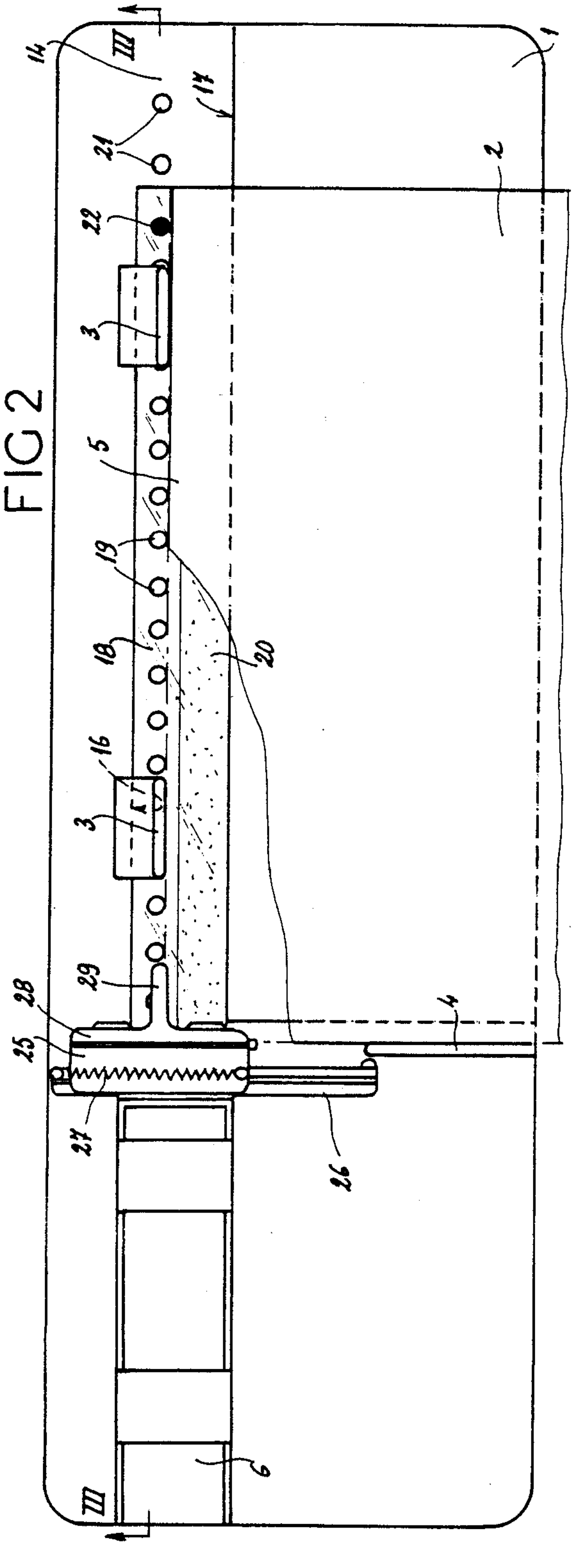
FIG. 2 is a plan view in which the sheet has been broken away and illustrates the apparatus in greater detail.

The cutting device 24 can comprise a body 25 which is displaceable transversely to the edge 5 and the tape 11 on a track or guide 26 from its position shown in FIG. 2 against the force of a tension spring 27 which returns the body 25 to its original position.

A removable plate 28 is provided with a lateral lug 29 engageable by the fingers of the user and clamps a razor blade 30 onto the body 25, this blade being positioned to sever the tape 11 during the movement of the blade to the left from its position shown in FIG. 4, for example.

The apparatus functions as follows:

Before placing the sheet 2 on the plate, a length of the tape 11 is drawn out by pulling on the tongue or strip 12 to cause the tape 11 to slide in the groove 15 until its free end 32 arrives in the region of the pin 22 previously positioned in a hole 21 for the format of the sheet which is used.

The free end of the tape is then placed over the pin 22 after the free end has been drawn several mm further to allow the perforation 23 to be fitted onto the pin 22.

The sheet 27 is then placed on the plate 1 in appropriate alignment by means of the stops 3 and 4. By pressing with a finger against the edge of the paper sheet, the user is able to ensure adhesion of the tape 11 to the paper by means of the self-adhesive layer. The cutter 24 is then actuated in the manner described to cut through the tape II and complete the application of the tape to the sheet. The sheet can then be removed and the process repeated.

It will be understood that the invention is not limited to the best mode embodiment which has been described but also includes variations thereon. For example, the plate 1 can have much larger dimensions than those represented in the drawing. The specific constructions of the cutter 24 and the means for anchoring the free end of the perforated strip can be modified as well.

I claim:

1. An apparatus for applying a self-adhesive perforated strip to a frontal edge of a sheet, comprising:

a plate having a surface on which said sheet can be placed flat;

frontal stops on said plate engageable with said edge of said sheet and at least one lateral stop on said plate engageable with a lateral edge of said sheet for aligning said sheet on said plate;

means on said plate outside a region thereof overlain by said sheet for receiving and positioning a receptacle containing a roll of a perforated tape, said perforated tape being formed with a pressure adhesive along one longitudinal portion of the tape, a row of perforations along another longitudinal portion of the tape and a masking strip covering said adhesive and strippable from the tape, said means on said plate being positioned so that said tape can be withdrawn from said receptacle along said plate without said masking strip and with said adhesive turned upwardly;

a groove formed in said surface of said plate, receiving the tape withdrawn from said receptacle, at least partially overhung by said frontal stops and overlain by said frontal edge of said sheet when said frontal edge of said sheet engages said frontal stops, whereby said sheet can be pressed against said adhesive along said frontal edge;

means in said groove remote from said receptacle for anchoring a free end of said tape; and means at an end of said groove proximal to said receptacle for cutting from said roll a length of said tape equal to the length of said frontal edge.

2. The apparatus defined in claim 1 wherein said means on said plate outside said region for receiving and positioning said receptacle is a casing on said surface and said groove is recessed below said surface.

3. The apparatus defined in claim 2 wherein said casing is formed with opening at a rear portion thereof to enable said receptacle to be inserted in said casing.

4. The apparatus defined in claim 3 wherein said means for anchoring said free end of said tape is adjustable.

5. The apparatus defined in claim 4 wherein said free end for anchoring said means of said tape comprises a row of holes formed in said groove and a pin engageable in one of the perforations of said tape and selectively receivable in said holes.

6. The apparatus defined in claim 4 wherein said receptacle is formed with a lateral face turned toward said groove and provided with a first slot at a base of said lateral face from which said tape is dispensed into said groove and a second slot above said first slot from which said masking strip emerges from said receptacle.

7. The apparatus defined in claim 4 wherein said means for cutting comprises a body, a guide enabling sliding displacement of said body in a direction transverse to said frontal edge and said tape, and a blade carried by said body for severing said tape.

8. The apparatus defined in claim 7 wherein said means for cutting includes a removable member holding said blade against said body and provided with a lug engageable by fingers of a user of the apparatus, and a spring connected to said body for returning said body to a starting position.

9. The apparatus defined in claim 8 wherein said blade is a razor blade.

* * * * *